Patented Sept. 11, 1951

2,567,340

UNITED STATES PATENT OFFICE 2,567,340

FISHING LINE JERK ATTACHMENT

George A. Lytle, Sacramento, Calif.

Application January 6, 1950, Serial No. 137,120

2 Claims. (Cl. 43—15)

1

This invention relates to devices used in combination with fishing tackle, and in particular an elongated tubular casing with a pawl pivotally mounted on a slider positioned on a plate which extends through the casing and which is provided with a tongue that extends from one end thereof through the end of the casing to provide means for attaching the device to a fishing line, and wherein the plate is provided with ratchet teeth positioned to coact with the pawl, and wherein a spring is provided in the casing for urging the pawl into engagement with the teeth.

The purpose of this invention is to provide means in a fishing line for securing fish on hooks when the attention of the fisherman is directed elsewhere or when the nibble or bite is too small to be transmitted through the line to the fisherman.

Various devices have been provided for automatically securing fish on hooks but in the usual device of this type it is necessary to retrieve the line in order to reset the device. With this thought in mind this invention contemplates a device for automatically providing a snap action in a fishing line as soon as a fish nibbles at the hook, in which the device is reset, within certain limits, by the pull of the fish on the hook.

The object of this invention is, therefore, to provide a fishing line snap actuator that withdraws a hook as a fish bites at the hook.

Another object of the invention is to provide means for automatically obtaining a snap action in a fishing line as a fish strikes a hook or bait on the hook in which the device is reset by continued pull of the fish so that it is not necessary for a fisherman to withdraw the line from the water.

A further object of the invention is to provide a snap actuating device for fishing lines which is of a simple and economical construction.

Other features and advantages of the invention will appear from the following description taken in connection with the drawings wherein.

2

Figure 5:
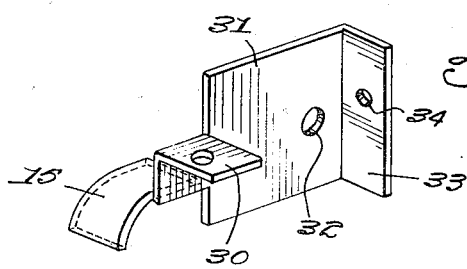

Figure 5 is a view illustrating the construction and arrangement of the pawl.

Figure 1:
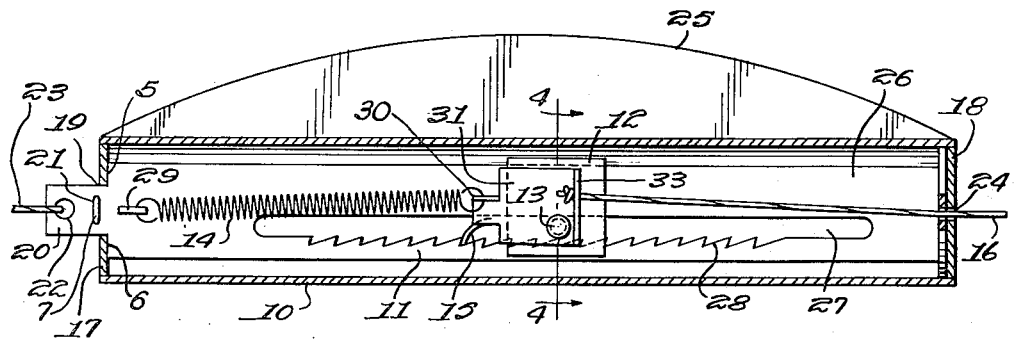
Figure 1 is a longitudinal section through the snap actuator showing a tongue at one end attached to a fishing line and a leader extended through the opposite end and attached to a pawl therein.

Referring now to the drawings wherein like reference characters denote corresponding parts the device for providing a snap action in a fishing line of this invention includes an elongated tubular casing 10 having a plate 11 extended therethrough with a follower 12 slidably mounted on the plate and with a pawl 15 pivotally mounted on the follower by a spin 13 through a plate 31 and, as illustrated in Figure 1, the pawl is held in engagement with ratchet teeth 28 in one side of an elongated slot 27 in the plate by a spring 14.

The plate 11 is provided with a tongue 20 that extends through a slot 19 in one end of the tubular casing and as the width of the tongue is less than that of the plate, shoulders 5 and 6 are provided in the sides of the plate and at the end from which the tongue 20 extends.

The tongue 20 is provided with an eye 22 through which a fishing line, as indicated by the numeral 23, may be attached to the device and the tongue is also provided with a slot 21 in which a key 7 is positioned.

Figure 2:
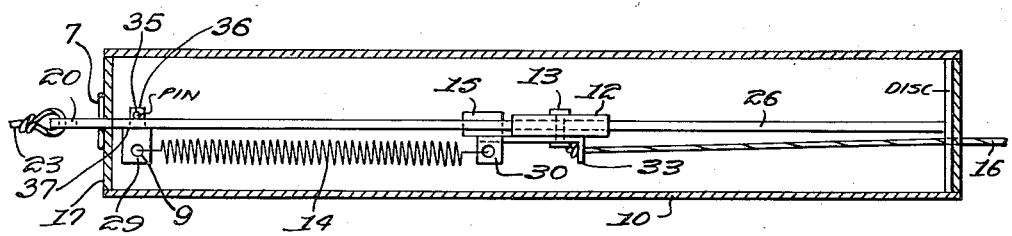
Figure 2 is a sectional plan through the casing with the parts arranged as shown in Figure 1.

A leader 16 of a fishing hook extends through an opening 24 in the opposite end 18 of the casing and, as illustrated in Figures 1 and 2, the leader 16 is attached to a flange 33 of the plate 31 that is pivotally mounted on the follower 12 by the pin 13. The leader 16 is secured in an opening 34 in the flange 33 and the opening is spaced above the axis of the pin 13 whereby a pull on the leader elevates the pawl 15, to the position shown in Figure 3.

One end of the spring 14 is attached to a flange 30 on an extension 8 which extends from the edge of the plate 31 on which the pawl is positioned and the pawl is formed on the lower edge of this extension. The opposite end of the spring is mounted in an eye 9, of a lug 29 that is mounted on the side of the plate 11 and, as illustrated in Figure 2, a stud 35, which extends through an opening in the plate 11 is secured in position by a pin 36 that holds a shoulder 37 formed at one end of the lug positioned on the opposite side of the plate.

One side of the casing 10 is provided with a fin 25 to prevent the casing rolling in the water, thereby substantially eliminating the possibility of twisting the fishing line.

Figure 3:
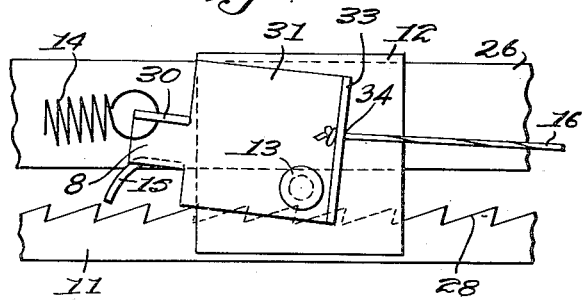
Figure 3 is a detail on an enlarged scale illustrating the pawl pivotally mounted on a follower and showing the pawl released from the ratchet.
Figure 4:
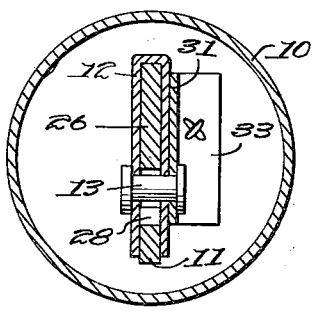
Figure 4 is a cross section through the device taken on line 4—4 of Figure 1.

When a fish bites a bait on a hook on the end of the leader 16 the force on the leader pivots the pawl about the pin 13 whereby the pawl 15 moves upwardly as shown in Figure 3 disengaging the teeth 28 of the ratchet and with the pawl disengaged from the teeth the spring 14 snaps the pawl and follower forwardly causing a snap or pull on the fish hook. This action is sufficient to secure the fish on the hook and continuous drag or pull by a fish, or by a force from another source on the leader 16 draws the pawl and follower back substantially to the position shown in Figure 1. This action resets the device. Should the follower work back to a position at the end of the slot in the leading end of the device or at the end to which the fishing line is attached it may be necessary to draw the device from the water and pull the leader 16 by hand to reset the device.

With the parts arranged in this manner the device may readily be incorporated in a fishing line with the line attached to the tongue and with the leader 16 of a hook attached to the pawl 15 and with the parts arranged in this manner the fishing line may be baited and used in the usual manner.

The comparatively light pull of a small fish is sufficient to raise the pawl 15 from the ratchet teeth so that the spring 14 snaps the hook into the mouth of the fish thereby securing the fish on the hook of the line.

It will be understood that modifications may be made in the design and arrangement of the parts without departing from the spirit of the invention.

What is claimed is:

1. A fishing line snap actuator comprising an elongated casing having a slot in one end and an opening in the opposite end, a plate having a slot extended throughout the intermediate portion thereof and spaced from the ends positioned in the casing, said plate having a tongue with a line attaching opening therein extended from one end and extended through the slot in the end of the casing, a follower slidably mounted on the plate, a pawl pivotally mounted on the follower, said plate having ratchet teeth positioned in one side of the slot therein and located to be engaged by the pawl, a spring positioned in the casing, means attaching one end of the spring to the plate, means attaching the opposite end of the spring to the pawl at a point spaced above the pivotal mounting thereof, and means for attaching a leader of a fish hook to the pawl at a point also positioned above the pivotal mounting of the pawl whereby a pull on the leader moves the pawl away from the ratchet teeth of the plate.

2. In a fishing line snap actuator, the combination which comprises an elongated tubular casing having a fin extended from one side and openings in the ends thereof, a plate having an elongated slot therein with ratchet teeth in one side of the slot positioned in the casing, said plate having a line attaching tongue extended from one end and extended through the opening in one end of the casing, a follower slidably mounted on the plate, a plate having a projection at one end and a flange on the other positioned on one side of the follower and having a pawl extended downwardly from the said projection, a pin pivotally mounting the plate on which the pawl is carried on the follower and extended through the elongated slot of the plate in the casing, said pawl being positioned to engage the ratchet teeth in the slots of the plate in the casing, and a spring attached to the projection of the pivotally mounted plate on which the pawl is carried and also to the plate extended through the casing, the flange of the said plate pivotally mounted on the follower having an opening therein providing means for attaching the leader of a fish hook thereto and said opening positioned above the center of the pivotal mounting of the plate on which the pawl is carried.

GEORGE A. LYTLE.

REFERENCES CITED

The following references are of record in the file of this patent:

UNITED STATES PATENTS

| Number | Name | Date |
|---|---|---|
| 2,394,821 | Teagarden | Feb. 12, 1946 |
| 2,403,202 | Woodward | July 2, 1946 |
| 2,495,990 | Sockell | Jan. 31, 1950 |